United States Patent
Fogle, Jr. et al.

[11] Patent Number: 5,558,366
[45] Date of Patent: Sep. 24, 1996

[54] INITIATOR ASSEMBLY FOR AIR BAG INFLATOR

[75] Inventors: Homer W. Fogle, Jr.; Todd Bailey; Brian R. Pitstick, all of Mesa; Eric Streif, Higley, all of Ariz.

[73] Assignee: TRW Inc., Lyundhurst, Ohio

[21] Appl. No.: 517,740

[22] Filed: Aug. 22, 1995

[51] Int. Cl.⁶ .................................................. B60R 21/26
[52] U.S. Cl. ........................... 280/736; 280/741; 102/530
[58] Field of Search ..................................... 280/736, 741, 280/728.2; 102/530, 531

[56] References Cited

U.S. PATENT DOCUMENTS

| | | | |
|---|---|---|---|
| 5,131,679 | 7/1992 | Novak et al. | 280/736 |
| 5,221,109 | 6/1993 | Marchant | 280/736 |
| 5,269,560 | 12/1993 | O'Loughlin et al. | 280/736 |

FOREIGN PATENT DOCUMENTS 5-178161  7/1993  Japan ..................................... 280/736

Primary Examiner—Paul N. Dickson
Attorney, Agent, or Firm—Tarolli, Sundheim, Covell, Tummino & Szabo

[57] ABSTRACT

An initiator assembly (140) comprises a retainer (46), which can be the cover for an inflator housing (10), and an igniter (142). An opening (85) is formed in the retainer (46). The igniter (142) has a longitudinal axis (143) and comprises a pyrotechnic material (152, 156) on the axis. The pyrotechnic material (152, 156) on ignition exerts a force along the axis (143). The assembly further comprises a preformed compressible plastic coupler plug (148) which includes a plug portion (170) received within the retainer opening (85). The coupler plug (148) comprises locking surfaces (184, 188) which engage the igniter (142) and the retainer (46) and hold the igniter in a spaced relationship with respect to the retainer. The plastic coupler plug (148) further comprises an inwardly extending compressible web (174) integral with the locking surfaces (184, 188). The compressible web (174) provides a seal in the space between the igniter (142) and the retainer (46). On ignition of the igniter pyrotechnic material (152, 156), the resulting axial force in the igniter (142) causes the web (174) to be compressed between opposed surfaces (194, 196) of the igniter and the retainer, respectively, increasing the seal tightness of the compressible web (174).

24 Claims, 3 Drawing Sheets 5,558,366

INITIATOR ASSEMBLY FOR AIR BAG INFLATOR

BACKGROUND OF THE INVENTION

1. Technical Field

The present invention relates to an inflatable vehicle occupant restraint, such as an air bag, and more particularly to an initiator assembly for igniting gas generating material to inflate the restraint.

2. Description of the Prior Art

It is well known to protect a vehicle occupant using an air bag which is inflated when the vehicle encounters sudden deceleration, such as in a collision. The air bag is inflated when the deceleration is of a magnitude sufficient to require air bag inflation. The air bag restrains movement of the vehicle occupant during the collision. The air bag is typically inflated by gas generated by ignition of gas generating material. The gas generating material is contained in an air bag inflator.

The air bag inflator commonly has an initiator which includes an electrically actuatable igniter to ignite the gas generating material. U.S. Pat. No. 5,131,679, assigned to the assignee of the present application, discloses an air bag inflator which comprises an electrically actuatable igniter. The inflator has a housing for containing the gas generating material. The housing includes a housing cover. The igniter is connected to the housing cover by a plastic molded body part which holds the igniter inside the inflator housing in proximity to the gas generating material. The cover is a metal part which is welded to the inflator housing. During assembly, the igniter and inflator cover are positioned in a die, in a spaced-apart relationship. The plastic material of the body part, in a molten state, is injected into the die. The plastic hardens and adheres to the cover and igniter. The plastic molded body part, in addition to connecting the igniter to the housing cover, also functions to seal the igniter within the inflator housing to prevent leakage of gas from the inflator following ignition of the gas generating material.

The injection molding step is a difficult manufacturing operation. It has to take place at relatively low pressures and temperatures because pyrotechnic material is contained within the igniter. This limits the materials and procedures which are available to form a good plastic-to-metal bond.

It is known to provide a plastic body part which is not injection molded around other component parts of the igniter and the inflator housing. In this design, the igniter is connected to an inflator housing part by an annular plastic collar which is snap-attached to the inflator housing part and to the igniter. The inflator housing part has an annular recess. The collar has an inwardly facing annular ridge which snaps into the inflator housing part recess. The igniter is provided with a similar recess, and the collar has a second annular inwardly facing ridge which snaps into the igniter recess as well. The collar thus holds the igniter and the inflator housing parts together. Component parts of the design have facing surfaces which are separated by a pair of O-ring seals. The O-ring seals seal the igniter within the inflator and prevent leakage of gas from the inflator following ignition of gas generating material within the inflator.

This known design has many component parts, including the two O-rings, adding to the cost of manufacture of the inflator. In addition, the collar has to be of a rigid plastic material to securely engage the recesses of the igniter and the inflator housing part.

SUMMARY OF THE INVENTION

The present invention is an initiator assembly. The initiator assembly comprises a retainer. The retainer has an opening therein. The assembly also comprises an igniter. The igniter has a longitudinal axis and comprises a pyrotechnic material on said axis, which on ignition, exerts an axial force. A preformed plastic coupler plug is received within the retainer opening. The coupler plug comprises locking surfaces which engage the igniter and the retainer and hold the igniter in a spaced relationship with respect to the retainer. The coupler plug comprises a sealing portion integral with the locking surfaces which provides a seal in the space between the retainer and the igniter. A preferred sealing portion is a compressible annular continuous web between opposed surfaces of the retainer and the igniter. On ignition of the igniter pyrotechnic material, the resulting axial force in the igniter compresses the coupler plug web between the retainer and igniter opposed surfaces increasing the seal tightness of the compressible web.

Preferably, the retainer has an annular detent around the retainer opening. The igniter also comprises an annular detent. The coupler plug comprises an annular skirt which is integral with the compressible web and which comprises conformed locking surfaces which engage the retainer and the igniter detents.

The present invention also relates to an inflator for an air bag which comprises the initiator assembly and also a housing. The retainer is a cover for the housing or a component welded to the housing cover.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED

EMBODIMENT OF THE INVENTION

Figure 1:
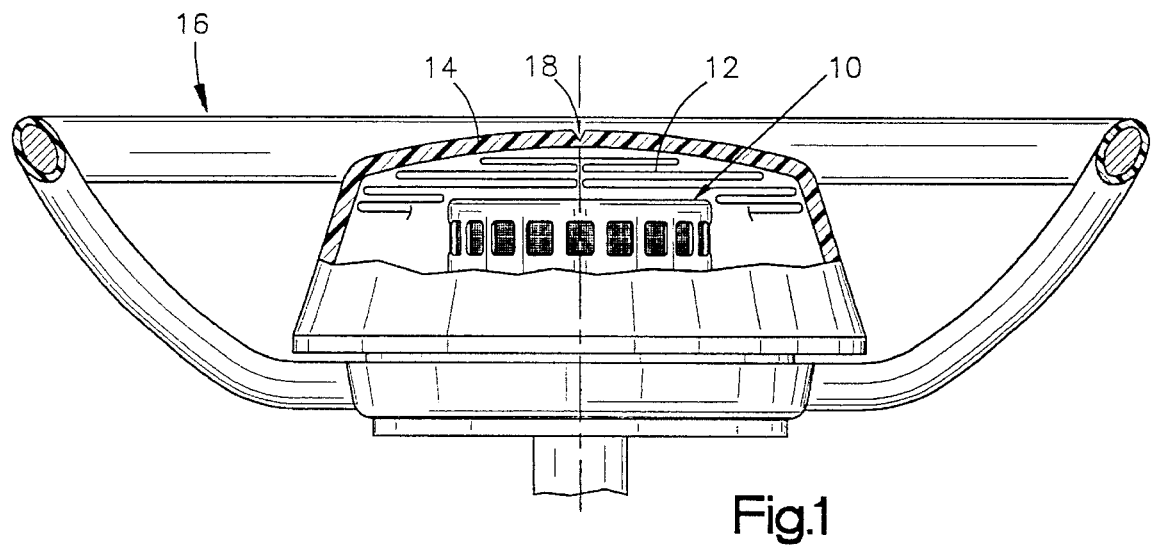
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of fluid, preferably a gas. The fluid from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

Figure 2:
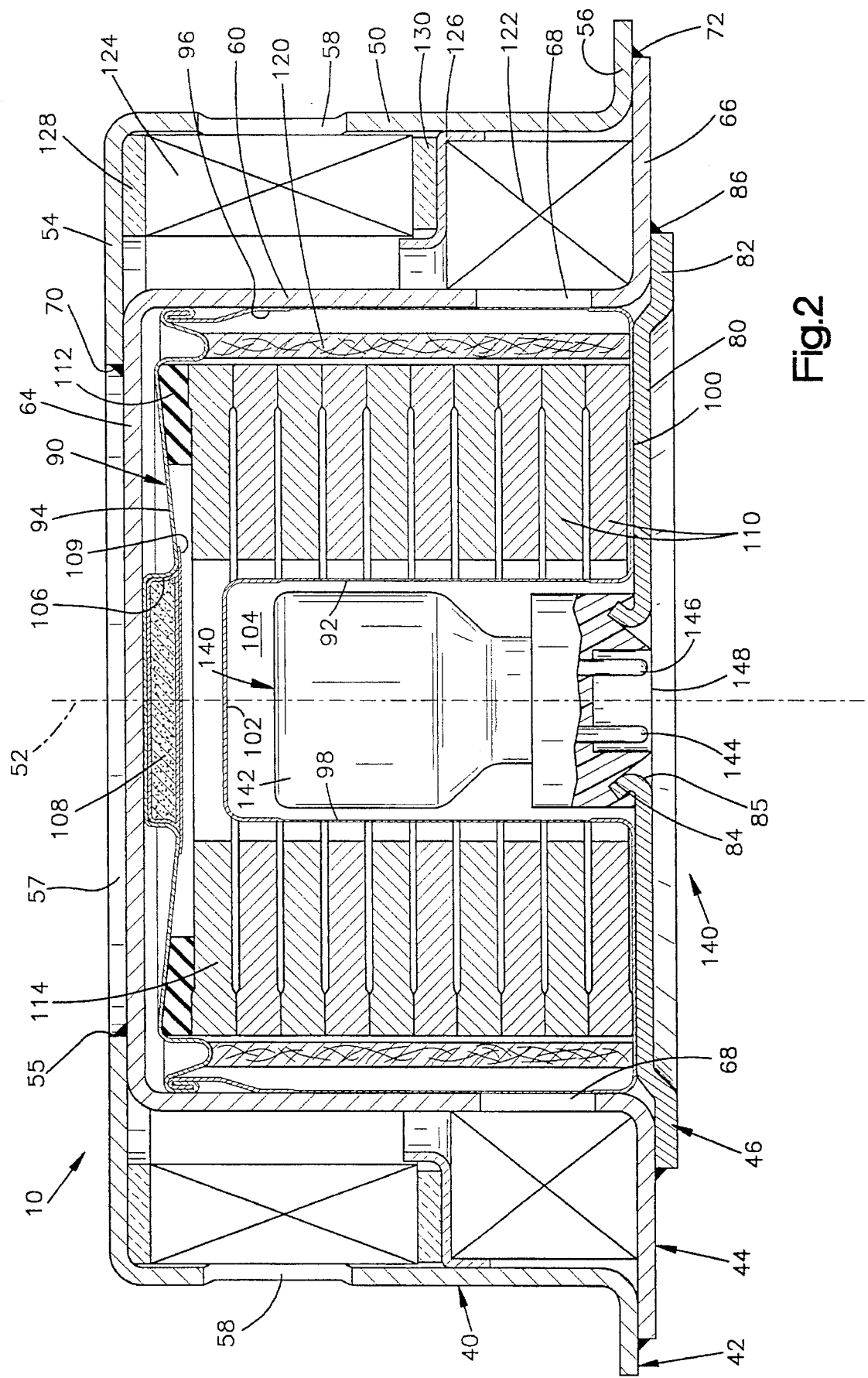
FIG. 2 is a transverse view, partially in section, of the inflator of FIG. 1.

The inflator 10 (FIG. 2) includes a housing 40. The housing 40 is made of three pieces, namely a diffuser cup 42, a combustion cup 44, and a combustion chamber retainer cover 46. The diffuser cup 42, the combustion cup 44, and the combustion chamber retainer cover 46 are made of a metal, such as AISI 301 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber retainer cover 46 is a generally flat metal piece having an annular planar portion 80 and a parallel but slightly offset annular outer flange 82. A sleeve 84 is located in the center of the retainer cover 46 extending upwardly and defining an opening 85 aligned with the inflator axis 52. The annular outer flange 82 of the retainer cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098. The gas generating material may alternatively be in the form of pellets or grains.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

Figure 3:
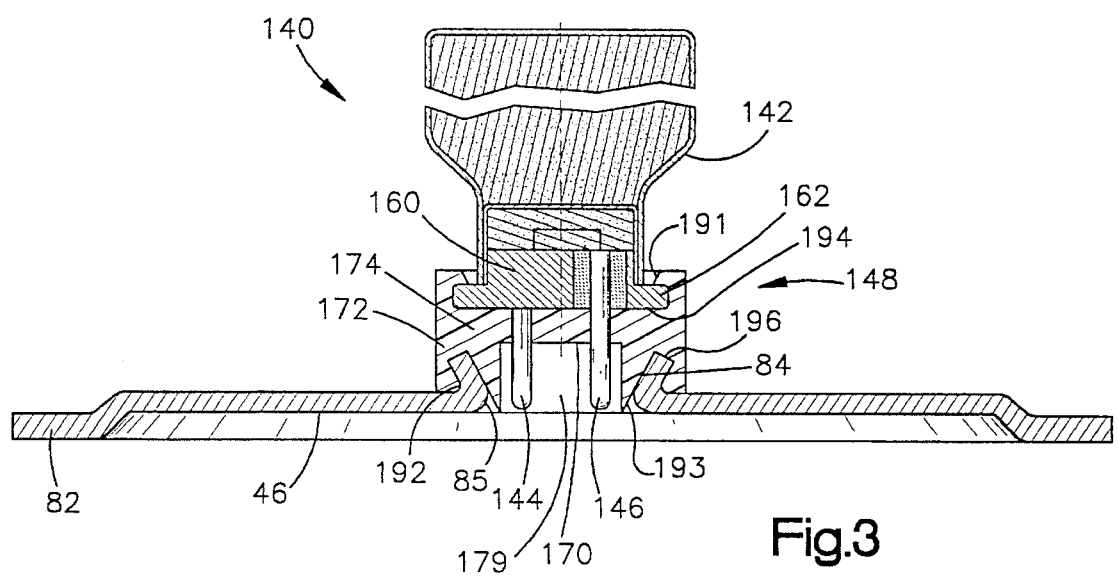
FIG. 3 is a transverse section view showing an initiator assembly in the inflator of FIG. 2.

The inflator 10 includes an initiator assembly 140. The initiator assembly 140 includes the igniter 142, which projects through the opening 85 in the retainer cover 46 into the central recess 104 of the canister 90. The igniter 142 has an axis 143 (FIG. 3A) which is aligned with the axis 52 of the inflator 10 and cover opening 85. The igniter 142 includes a pair of electrodes 144 and 146 which extend outwardly from the initiator assembly 140. The electrodes 144 and 146 are connectable to a collision sensor (not shown). The igniter 142 may be of any suitable well known construction. Referring to FIG. 3, the initiator assembly 140 also includes a plastic molded coupler plug 148 which holds the igniter 142 onto the retainer cover 46.

Figure 3A:
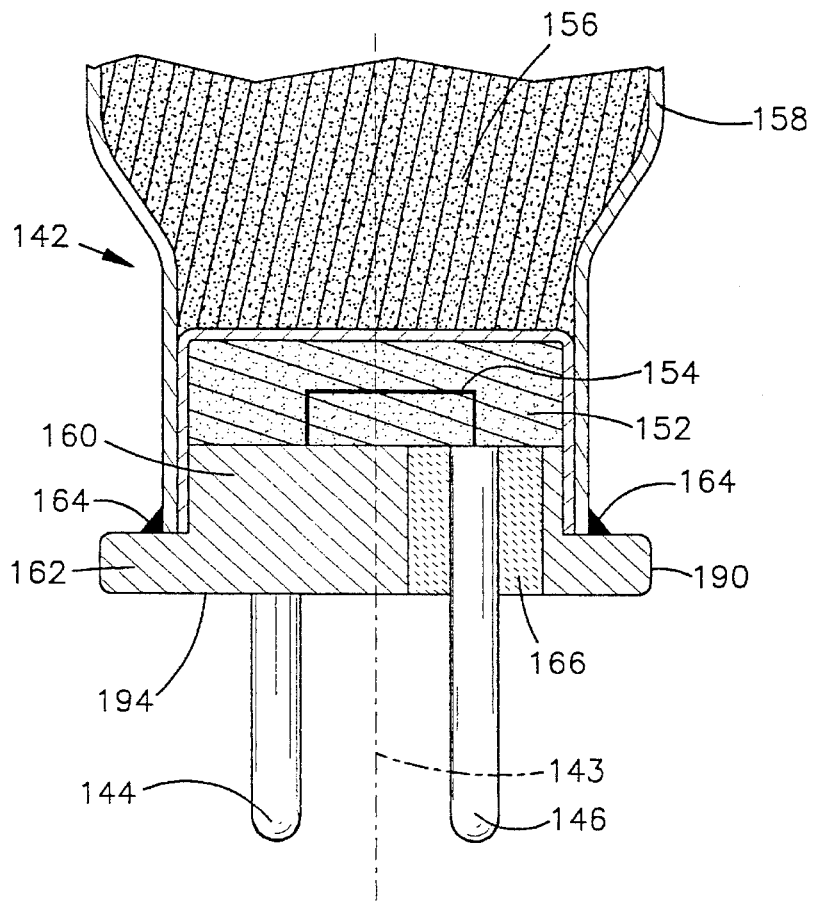
FIG. 3A is an enlarged section view showing an igniter in the assembly of FIG. 3.

As shown in FIG. 3A, the igniter 142 includes an ignition charge 152. The electrode 146 terminates in a bridge wire 154 located within the ignition charge 152. The opposite end of the bridge wire 154 is connected to a metal header 160. The ignition charge 152 is a pyrotechnic material ignitable by a heated bridge wire. A body 156 of enhancer material, such as BKNO₃, is located above the ignition charge 152. A metal cup 158 encloses the enhancer material 156 and the ignition charge 152. The metal cup 158 seats over and onto the metal header 160, so that the metal header closes the open end of the cup 158. The metal header 160 has a continuous annular flange 162. The metal cup 158 seats against the flange 162 and is welded to the flange by annular weld 164. The electrode 144 extends up to and is connected to the underside of metal header 160. The electrode 146 extends through the metal header 160 and is insulated from the metal header 160 by glass seal 166.

Upon the occurrence of a collision or other sudden vehicle deceleration, a collision sensor closes an electrical circuit. An electrical current then flows through the electrodes 144 and 146 and the bridge wire 154. The bridge wire 154 is heated and ignites the ignition charge 152 which, in turn, ignites the enhancer material 156. Ignition of the enhancer material bursts the metal cup 158, releasing hot combustion products which flow outwardly from the igniter 142 and rupture the inner top wall 102 (FIG. 2) and the inner side wall 98 of the canister 90. The hot combustion products from the igniter 142 ignite the disks 110 of gas generating material. The disks 110 of gas generating material rapidly produce a large volume of hot gas.

The pressure of the gas acts on the cylindrical side wall 96 of the canister 90, forcing the side wall 96 radially outwardly against the combustion cup side wall 60, rupturing the side wall 96 adjacent the openings 68. The gas generated by burning of the disks 110 then flows radially outwardly through the prefilter 120, slag screen 122, and final filter assembly 124. Because of the rapid generation of gas by the combustion of the gas generating material, and the resistance to flow created by the component parts of the inflator, a high pressure of hot gas is quickly generated within the inflator housing.

Figure 3B:
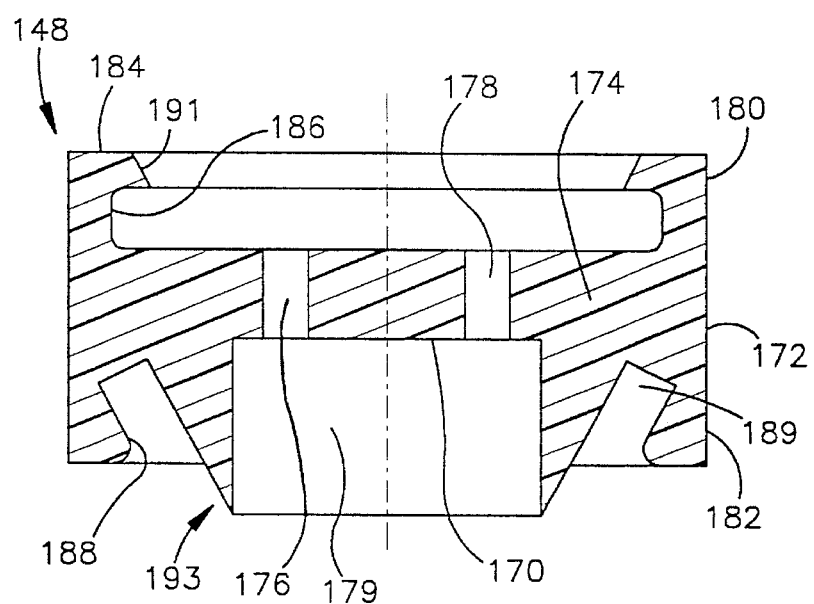
FIG. 3B is an enlarged section view showing a preformed plastic coupler of the assembly of FIG. 3.

Referring to FIG. 3B, the plastic coupler plug 148 is a premolded plastic member in the general shape of a cork having an axial plug portion 170. The coupler plug 148 has an annular cylindrical skirt 172. The cylindrical skirt 172 is connected to the plug portion 170 by a continuous radially extending web 174. The plug portion 170 has axially extending holes 176 and 178 through which the electrodes 144 and 146 of the igniter extend. The plug portion is hollowed to provided an axial recess 179 into which the holes 176, 178 lead.

The cylindrical skirt 172 has an upper portion 180, above web 174, and a lower portion 182, below web 174. The upper portion 180 has an inwardly directed continuous annular lip 184 which forms, with web 174, a continuous recess 186. The lower portion 182 has an inwardly directed continuous annular boss 188 which defines, with the plug portion 170, a truncated recess 189.

As shown in FIG. 3A, the header flange 162 of the igniter 142 has an outer edge 190. To assemble the initiator assembly of FIG. 3, the electrodes 144 and 146 of the igniter 142 are positioned in holes 176 and 178 of the premolded plastic coupler plug 148. The igniter 142 and coupler plug 148 are then pressed together until the lip 184 of the coupler plug 148 snaps over the flange 162 of the igniter header. This seats the flange outer edge 190 in the continuous recess 186 of the coupler plug 148. When so seated, the electrodes 144, 146 extend into the plug recess 179, as shown in FIG. 3. The lip 184 (FIG. 3B) is chamfered at chamfer 191 to facilitate pressing the igniter 142 and coupler plug 148 together.

The header flange 162 is at the base of the header 160. The upper portion 180 of the skirt 172 extends upwardly only far enough to embrace the flange 162. Thus, the coupler plug 148 is essentially free of exposure to radial forces when the ignition charge 152 and enhancer material 156 of the igniter 142 are ignited.

The premolded plastic coupler plug 148 is then assembled onto the retainer cover 46 (FIG. 3) by pressing the plug portion 170 of the coupler plug into opening 85, defined by the sleeve 84, of the cover 46. The sleeve 84 has a funnel configuration so that it defines an outer continuous annular recess 192, as shown in FIG. 3. The plug portion 170 is pressed into opening 85 until the inwardly directed boss 188 of the skirt 172 snaps into the annular recess 192 of the cover sleeve 84 and sleeve 84 seats in the coupler plug truncated recess 189. The plug portion 170 has a chamfered surface at chamfer 193 which facilitates pressing the plug portion 170 of the coupler plug into opening 85 of the sleeve 84.

In the above assembly, the plastic premolded coupler plug 148 has sufficient flexibility to allow the skirt upper and lower portions 180 and 182 (FIG. 3B) to expand over cooperating surfaces of the igniter 142 and the retainer cover 46. When the coupler plug 148 is properly seated onto the igniter 142 and the retainer cover 46, it holds the igniter 142 in a position spaced from the container cover 46. The coupler plug 148 also holds the electrodes 144 and 146 in a spaced-apart relationship and insulates the electrodes from each other and from other metal surfaces of the inflator. Preferably, the coupler plug 148 is made of an electromagnetically lossy material to attenuate radio frequency energy.

When assembled, the annular web 174 of the plastic premolded coupler plug 148 is sandwiched between the lower surface 194 (FIG. 3A) of the igniter header 160 and upper surface 196 at the distal end of the retainer cover sleeve 84, as shown in FIG. 3. The surfaces 194 and 196 are generally at right angles to the axis 143 of the igniter 142 and retainer cover 46, respectively, and are opposite one another. The material of the coupler plug 148 is not only flexible, but is also compressible. Ignition of the ignition charge 152 and enhancer material 156 of the igniter 142 causes an axial force to be exerted on header 160 in the direction of cover 46. This forces the header 160 to move axially in the direction of cover 46 and compress the web 174 between surfaces 194 and 196. This compression increases the seal tightness in the space between the igniter 142 and the retainer cover 46. The compression is maintained throughout combustion of the gas generating material 110. The higher the internal pressure within the inflator 10, the greater the seal tightness exerted on web 174 by the opposed surfaces 194, 196.

The premolded plastic coupler plug 148 is preferably made of a thermosetting plastic material. A large number of thermosetting plastic materials are available. Examples are a polysulfide rubber marketed by Thiokol Chemical Corporation, a polyurethane rubber marketed under the trademark "ADIPRENE" by E. I. dupont de Nemours Company, styrene butadiene rubber, silicone rubber marketed by Dow Corning Corporation under the trademark "SILASTIC", neoprene rubber marketed by Distugil under the trademark "BUTACLOR", nitrile rubber which is a copolymer of butadiene and acrylonitrile, a polyacrylate rubber marketed by B. F. Goodrich Chemical Company under the trademark "HYCAR", ethylene propylene rubber (EPM or EPDM), fluorocarbon rubber, for instance "VITON" marketed by E. I. dupont de Nemours Company, a fluorosilicone rubber, for instance "SILASTIC L.S." marketed by Dow Corning Corp., polyisoprene rubber, butadiene rubber, butyl rubber, and epichlorohydrin rubber.

The properties of the rubber are important. Specifically, the rubber preferably has a Shore A hardness in the range of about 20 to about 100 throughout a temperature range of −40° C. to about 150° C. This provides compressibility of web 174 by the oppositely facing surfaces 194, 196 of the igniter 142 and cover 46 on the development of a high pressure within the inflator 10. The rubber preferably has a modulus of elasticity in the range of 400 to 500 at room temperature, to permit assembly of the component parts. The rubber also preferably has a tensile strength in the range of about 750 to about 1,500 psi and maximum percent elongation of about 800%, in a temperature range of −40° C. to 150° C., to hold the initiator assembly together during the combustion of the gas generating material in the inflator. In this respect, as mentioned above, the design of the component parts is such that the coupler plug 148 is not subjected to radial stresses from ignition of the ignition charge 152 and enhancer material 156, of the igniter 142, but only axial forces.

Advantages of the present invention should be apparent. Primarily, the present invention provides an initiator assembly which includes the igniter 142 and the retainer cover 46 and which is composed of a minimum number of parts and thus is inexpensive to make. In addition, the present invention provides an initiator assembly which is easy to manufacture. The igniter 142 is a preassembled component. The retainer cover 46 is a preformed component. The plastic coupler plug 148 is premolded, and can be fabricated separately from the retainer cover 46. Attaching the igniter 142 to the retainer cover 46 is accomplished simply by snapping the coupler plug 148 onto the igniter 142, and then onto the retainer cover 46, requiring only two assembly steps. At the same time, the coupler plug 148 of the present invention securely holds the igniter 142 to the retainer cover 46, even during actuation of the igniter 142 and combustion of the gas generating grains 110 in the inflator 10. The design is such that the coupler plug 148 is exposed only to axial forces and not radial forces. Further, the coupler plug 148, during such actuation and combustion of the gas generating grains, provides an effective seal which increases in seal tightness with increasing pressure within the inflator.

From the description of the invention, those skilled in the art will perceive improvements, changes and modifications. Such improvements, changes and modifications within the skill of the art are intended to be covered by the appended claims.

Having described the invention, the following is claimed:

1. An initiator assembly comprising:
   (a) a retainer comprising an opening;
   (b) an igniter having a longitudinal axis and comprising a pyrotechnic material on said axis which on ignition exerts an axial force; and
   (c) a preformed plastic coupler plug received within said retainer opening, said plug comprising
      (i) locking surfaces engaging said igniter and said retainer and holding said igniter in a spaced relationship with respect to said retainer;
      (ii) a sealing portion integral with said locking surfaces providing a seal in the space between said retainer and said igniter, said sealing portion increasing in seal tightness when exposed to said axial force;
   said igniter longitudinal axis being aligned with said retainer opening and said axial force being exerted in the direction of said opening;
   said igniter and said retainer comprising opposed spaced-apart surfaces and said coupler plug sealing portion being a compressible annular continuous web between said opposed spaced-apart surfaces;
   said coupler plug comprising an annular skirt integral with said compressible web and said locking surfaces being on said skirt;
   said retainer and said igniter each comprising an annular detent and said skirt locking surfaces engaging said detents.

2. An initiator assembly comprising:
   (a) a retainer comprising an opening;
   (b) an igniter having a longitudinal axis and comprising a pyrotechnic material on said axis which on ignition exerts an axial force; and
   (c) a preformed plastic coupler plug received within said retainer opening, said plug comprising
      (i) locking surfaces engaging said igniter and said retainer and holding said igniter in a spaced relationship with respect to said retainer;
      (ii) a sealing portion integral with said locking surfaces providing a seal in the space between said retainer and said igniter, said sealing portion increasing in seal tightness when exposed to said axial force;
   said igniter longitudinal axis being aligned with said retainer opening and said axial force being exerted in the direction of said opening;
   said igniter and said retainer comprising opposed spaced-apart surfaces and said coupler plug sealing portion being a compressible annular continuous web between said opposed spaced-apart surfaces;
   said compressible web having a shore A hardness in the range of about 20 to about 100 in a temperature range between about −40° C. to about 150° C.

3. An assembly comprising:
   (a) a retainer comprising an annular sleeve which defines an opening;
   (b) an igniter having a longitudinal axis and an annular flange, said igniter comprising pyrotechnic material centered about said axis and which on ignition exerts an axial force;
   said igniter flange and said retainer sleeve comprising respective first and second surfaces which are spaced apart along said longitudinal axis, said first surface on said igniter flange being acted on by said axial force and being moved towards said second surface on said retainer sleeve when acted upon by said axial force; and
   (c) a plastic coupler plug received within said retainer opening and for holding said igniter in a spaced relationship with respect to said retainer, said coupler plug comprising
      (i) first means for locking said coupler plug to said igniter, said first means comprising a first locking surface means which non-adheringly engages said first surface of said igniter flange;
      (ii) second means for locking said coupler plug to said retainer, said second means comprising a second locking surface means which non-adheringly engages said second surface of said retainer sleeve; and
      (iii) a sealing portion integral with said first and second means and said first and second locking surface means sealing the space between said first and second surfaces of said igniter flange and said retainer sleeve, respectively, said sealing portion being acted on by said axial force and being compressed between said first and second surfaces of said igniter flange and said retainer sleeve, respectively, to increase the seal tightness when acted on by said axial force.

4. The assembly of claim 3 wherein said igniter longitudinal axis is aligned with said retainer opening and said axial force is exerted in the direction of said opening.

5. The assembly of claim 4 wherein said coupler plug sealing portion is a compressible annular continuous web between said first and second surfaces of said igniter flange and said retainer sleeve, respectively.

6. The assembly of claim 5 wherein said coupler plug includes an axis aligned with said igniter longitudinal axis and said compressible web extends transverse to said plug axis.

7. The assembly of claim 5 wherein said coupler plug further comprises an annular skirt integral with said compressible web, said first and second locking surfaces being on said skirt.

8. The assembly of claim 7 wherein said skirt is essentially free of radial forces resulting from ignition of said pyrotechnic material.

9. The assembly of claim 3 wherein said retainer is an inflator housing cover.

10. An initiator assembly comprising:
(a) a retainer comprising an annular detent;
(b) an igniter axially aligned with and spaced from said retainer, said igniter comprising an annular detent; and
(c) a preformed plastic coupler plug connecting the igniter to the retainer, the coupler plug comprising
(i) an annular skirt partially encompassing the retainer and igniter and comprising conformed locking surfaces engaging said detents, and
(ii) a compressible continuous annular web integral with said skirt extending radially inwardly from said skirt,
the retainer and igniter comprising facing surfaces seated against opposite sides of said coupler plug web, said web sealing the space between said retainer and igniter.

11. The assembly of claim 10 wherein said retainer is an inflator housing cover and comprises an axially extending sleeve, and wherein said retainer annular detent is an outwardly facing continuous recess defined by said sleeve.

12. The assembly of claim 11 wherein said coupler plug comprises an axial plug portion which seats within the opening of said retainer sleeve, and said annular web extends between and is integral with said skirt and said axial plug portion.

13. The assembly of claim 10 wherein said igniter comprises a header, and said igniter detent is an annular outwardly extending continuous flange on said header.

14. The assembly of claim 10 wherein said igniter comprises pyrotechnic material, and said skirt is essentially free of radial forces resulting from the ignition of said pyrotechnic material.

15. The assembly of claim 14 wherein said igniter comprises a header and said igniter detent is an annular outwardly extending continuous flange on said header, said pyrotechnic material being on one side of said header and said flange being on the opposite side.

16. The assembly of claim 10 wherein said compressible web has a shore A hardness in the range of about 20 to about 100 in a temperature range between −40° C. to 150° C.

17. The assembly of claim 16 wherein said coupler plug is a preform of a thermoplastic material having a modulus of elasticity in the range of about 400 to about 500 psi at room temperature.

18. The assembly of claim 13 wherein said retainer comprises an axially extending sleeve and said retainer annular detent is an outwardly facing continuous recess defined by said sleeve and said conformed locking surfaces are an annular continuous boss engaging said sleeve recess and an annular continuous recess engaging said header outwardly extending flange.

19. The assembly of claim 10 wherein said igniter includes a header, a container cup secured to said header, and a pyrotechnic material within said container cup, and said annular skirt is essentially free of radial forces resulting from ignition of said pyrotechnic material.

20. The assembly of claim 12 wherein said igniter includes electrodes extending through said axial plug portion.

21. The assembly of claim 20 wherein said igniter is a preassembly and said coupler plug is premolded.

22. An inflator for an air bag comprising the assembly of claim 10.

23. The inflator of claim 22 comprising a housing and a cover for said housing, wherein said cover is said retainer.

24. The inflator of claim 23 wherein said retainer includes a continuous annular flange, an axial sleeve integral with said flange and defining a central opening, and said flange is secured to said inflator housing, said coupler plug comprising an axial plug portion seated within the opening of said retainer sleeve.

* * * * *